(12) United States Patent
Kamath et al.

(10) Patent No.: US 10,990,629 B2
(45) Date of Patent: Apr. 27, 2021

(54) STORING AND IDENTIFYING METADATA THROUGH EXTENDED PROPERTIES IN A HISTORIZATION SYSTEM

(71) Applicant: AVEVA Software, LLC, Lake Forest, CA (US)

(72) Inventors: Vinay T. Kamath, Rancho Santa Margarita, CA (US); Abhijit Manushree, Laguna Niguel, CA (US); Elliott Middleton, Tyler, TX (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 0 days.

(21) Appl. No.: 16/460,756

(22) Filed: Jul. 2, 2019

(65) Prior Publication Data

US 2019/0324987 A1 Oct. 24, 2019

Related U.S. Application Data

(63) Continuation of application No. 14/833,906, filed on Aug. 24, 2015, now abandoned, which is a continuation-in-part of application No. 14/789,654, filed on Jul. 1, 2015, now abandoned, which is a continuation-in-part of application No. 14/704,666, filed on May 5, 2015, now abandoned, which is a continuation-in-part of application No. 14/704,661, filed on May 5, 2015, now abandoned.

(60) Provisional application No. 62/092,051, filed on Dec. 15, 2014, provisional application No. 61/988,731, filed on May 5, 2014.

(51) Int. Cl.
*G06F 16/907* (2019.01)

(52) U.S. Cl.
CPC .............................. *G06F 16/907* (2019.01)

(58) Field of Classification Search
CPC .... G06F 16/907; G06F 16/219; G06F 16/128; G06F 16/313; G06F 16/328; G06F 16/22
USPC .................................................. 707/749, 751
See application file for complete search history.

(56) References Cited

U.S. PATENT DOCUMENTS

| | | | |
|---|---|---|---|
| 10,417,263 B2* | 9/2019 | MacK | G06F 16/2365 |
| 2006/0074980 A1* | 4/2006 | Sarkar | G06F 16/958 |
| 2008/0104542 A1* | 5/2008 | Cohen | G06F 16/951 715/810 |
| 2008/0133486 A1* | 6/2008 | Fitzgerald | G06F 21/6218 |

(Continued)

*Primary Examiner* — James Trujillo
*Assistant Examiner* — Fariborz Khoshnoodi
(74) *Attorney, Agent, or Firm* — Greenberg Traurig, LLP

(57) ABSTRACT

A historian system enables the creation, storage, and retrieval of extended metadata properties. A tag metadata database module of the historian system stores tag metadata received over a network connection in a tag metadata database and retrieves tag metadata in response to requests received over the network and from within the historian system. An extended property database module creates extended properties associated with a tag metadata instance in response to requests, stores the created extended properties, and retrieves the stored extended properties in response to requests. The extended property search index module indexes extended properties as they are created, searches the indexed extended properties in response to requests, and provides the indexes of extended properties to enable location of the extended properties in the extended property database.

13 Claims, 11 Drawing Sheets

(56) References Cited

U.S. PATENT DOCUMENTS

| | | | |
|---|---|---|---|
| 2008/0300900 A1* | 12/2008 | Demarest | G06F 21/6272 |
| | | | 705/1.1 |
| 2009/0144393 A1* | 6/2009 | Kudo | G06F 9/5044 |
| | | | 709/218 |
| 2013/0124575 A1* | 5/2013 | Plache | G05B 19/0423 |
| | | | 707/800 |
| 2015/0254257 A1* | 9/2015 | Kritchko | G06F 16/2282 |
| | | | 707/634 |
| 2020/0089666 A1* | 3/2020 | Naryzhny | H04L 67/125 |

* cited by examiner

STORING AND IDENTIFYING METADATA THROUGH EXTENDED PROPERTIES IN A HISTORIZATION SYSTEM

CROSS REFERENCE TO RELATED APPLICATIONS

This application is a continuation of U.S. application Ser. No. 14/833,906, filed Aug. 24, 2015, which is a continuation-in-part of U.S. application Ser. No. 14/789,654, filed Jul. 1, 2015, which is a continuation-in-part of U.S. application Ser. No. 14/704,661, filed May 5, 2015, which is a continuation-in-part of U.S. application Ser. No. 14/704,666, filed May 5, 2015, which claims the benefit of and priority to U.S. Provisional Application No. 61/988,731, filed eft May 5, 2014, and U.S. Provisional Application No. 62/092,051, filed Dec. 15, 2014. The entire contents of the above identified applications are expressly incorporated herein by reference, including the contents and teachings of any references contained therein.

BACKGROUND

Aspects of the present invention generally relate of the fields of networked computerized industrial control, automation systems and networked computerized systems utilized to monitor, log, and display relevant manufacturing/production events and associated data, and supervisory level control and manufacturing information systems. Such systems generally execute above a regulatory control layer in a process control system to provide guidance to lower level control elements such as, by way of example, programmable logic controllers or distributed control systems (DCSs). Such systems are also employed to acquire and manage historical information relating to processes and their associated outputs. More particularly, aspects of the present invention relate to systems and methods for storing and preserving gathered data and ensuring that the stored data is accessible when necessary. "Historization" is a vital task in the industry as it enables analysis of past data to improve processes.

Typical industrial processes are extremely complex and receive substantially greater volumes of information than any human could possibly digest in its raw form. By way of example, it is not unheard of to have thousands of sensors and control elements (e.g., valve actuators) monitoring/controlling aspects of a multi-stage process within an industrial plant. These sensors are of varied type and report on varied characteristics of the process. Their outputs are similarly varied in the meaning of their measurements, in the amount of data sent for each measurement, and in the frequency of their measurements. As regards the latter, for accuracy and to enable quick response, some of these sensors/control elements take one or more measurements every second. Multiplying a single sensor/control element by thousands of sensors/control elements (a typical industrial control environment) results in an overwhelming volume of data flowing into the manufacturing information and process control system. Sophisticated data management techniques have been developed to store and maintain the large volumes of data generated by such system. These issues are compounded in a system that stores data from multiple tenants at once in such a way that each tenant's data is secure from access by others and enables users to create and define custom data properties to be associated with their data. It is a difficult but vital task to ensure that the process is running efficiently.

SUMMARY

Aspects of the present invention permit creation and retrieval of extended properties associated with tag metadata instances of process data. Moreover, aspects of the invention provide secure storage of the extended properties and efficient indexed searching of the extended properties.

In one form, a historian system enables the creation, storage, and retrieval of extended metadata properties. The system has a client access module, a tag metadata database module, an extended property database module, and an extended property search index module. The client access module receives and responds to messages over a network connection. The tag metadata database module stores tag metadata received over a network connection in the tag metadata database and retrieves tag metadata in response to requests received over the network and from within the historian system. The extended property database module creates extended properties associated with a tag metadata instance in response to requests, stores the created extended properties, and retrieves the stored extended properties in response to requests. The extended property search index module indexes extended properties as they are created, searches the indexed extended properties in response to requests, and provides the indexes of extended properties to enable location of the extended properties in the extended property database.

In another form, a method for creating extended metadata properties in a historian system is provided.

In yet another form, a method for retrieving extended metadata properties in a historian system is provided.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
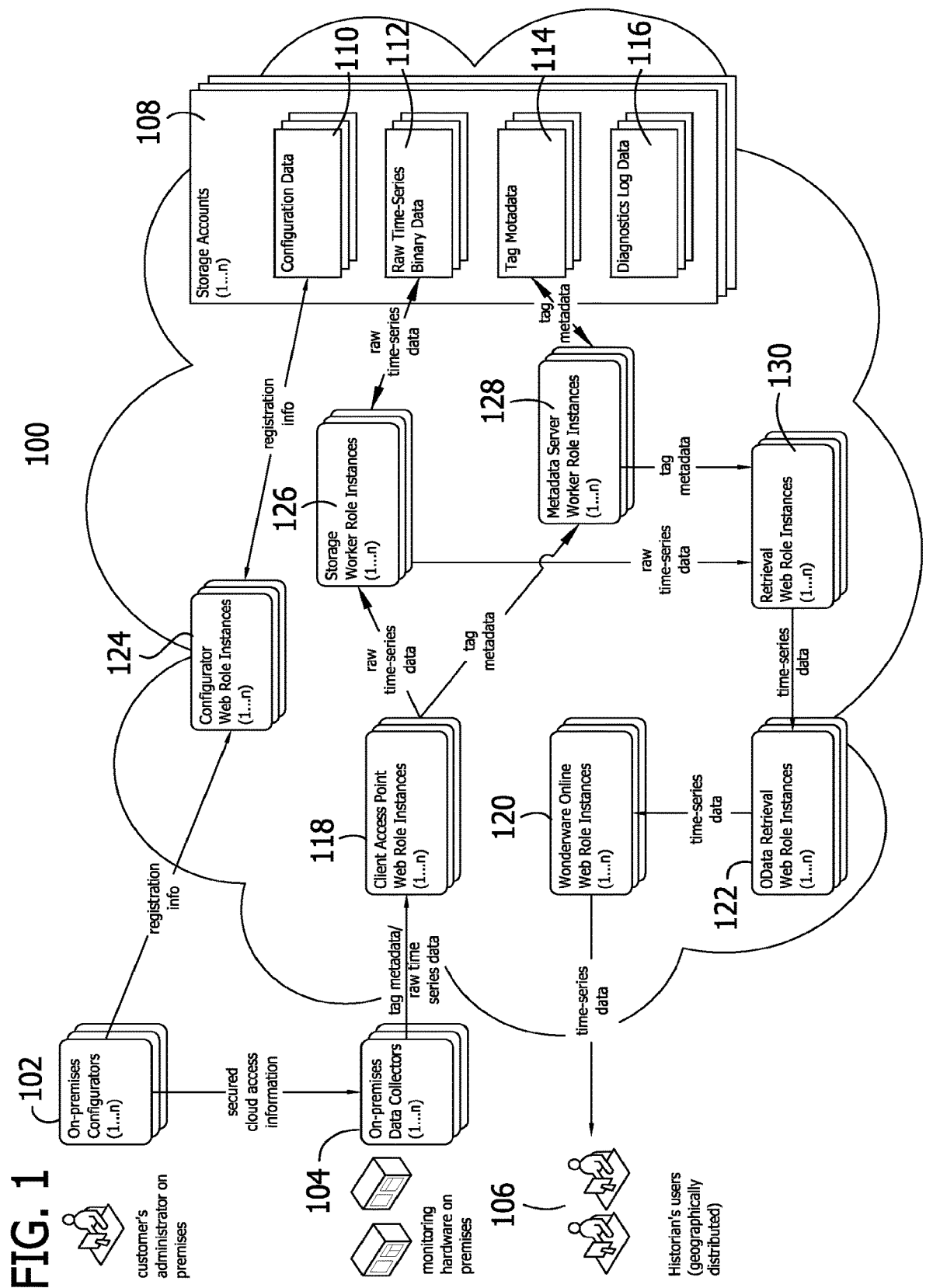
FIG. 1 is a diagram detailing architecture of a historian system according to an embodiment of the invention.

Referring to FIG. 1, a distributed historian system, generally indicated at 100, enables users to log into the system to easily view relationships between various data, even if the data is stored in different data sources. The historian system 100 can store and use data from various locations and facilities and use cloud storage technology to ensure that all the facilities are connected to all the necessary data. The system 100 forms connections with configurators 102, data collectors 104, and user devices 106 on which the historian data can be accessed. The configurators 102 are modules that may be used by system administrators to configure the functionality of the historian system 100. The data collectors 104 are modules that connect to and monitor hardware in the process control system to which the historian system 100 is connected. The data collectors 104 and configurators 102 may be at different locations throughout the process control system. The user devices 106 comprise devices that are geographically distributed, enabling historian data from the system 100 to be accessed from various locations across a country or throughout the world.

In an embodiment, historian system 100 stores a variety of types of information in storage accounts 108. This information includes configuration data 110, raw time-series binary data 112, tag metadata 114, and diagnostic log data 116. The storage accounts 108 may be organized to use table storage or other configuration, such as page blobs.

In an embodiment, historian system 100 is accessed via web role instances. As shown, configurators 102 access configurator web role instances 124. And data collectors 104 access client access point web role instances 118. Online web role instances 120 are accessed by the user devices 106. The configurators 102 share configuration data and registration information with the configurator web role instances 124. The configuration data and registration information is stored in the storage accounts 108 as configuration data 110. The data collectors 104 share tag metadata and raw time-series data with the client access point web role instances 118. The raw time-series data is shared with storage worker role instances 126 and then stored as raw time-series binary data 112 in the storage accounts 108. The tag metadata is shared with metadata server worker role instances 128 and stored as tag metadata 114 in the storage accounts 108. The storage worker role instances 126 and metadata server worker role instances 128 send raw time-series data and tag metadata to retrieval worker role instances 130. The raw time-series data and tag metadata is converted into time-series data and sent to the online web role instances 120 via data retrieval web role instances 122. Users using the user devices 106 receive the time-series data from the online web role instances 120.

Figure 2:
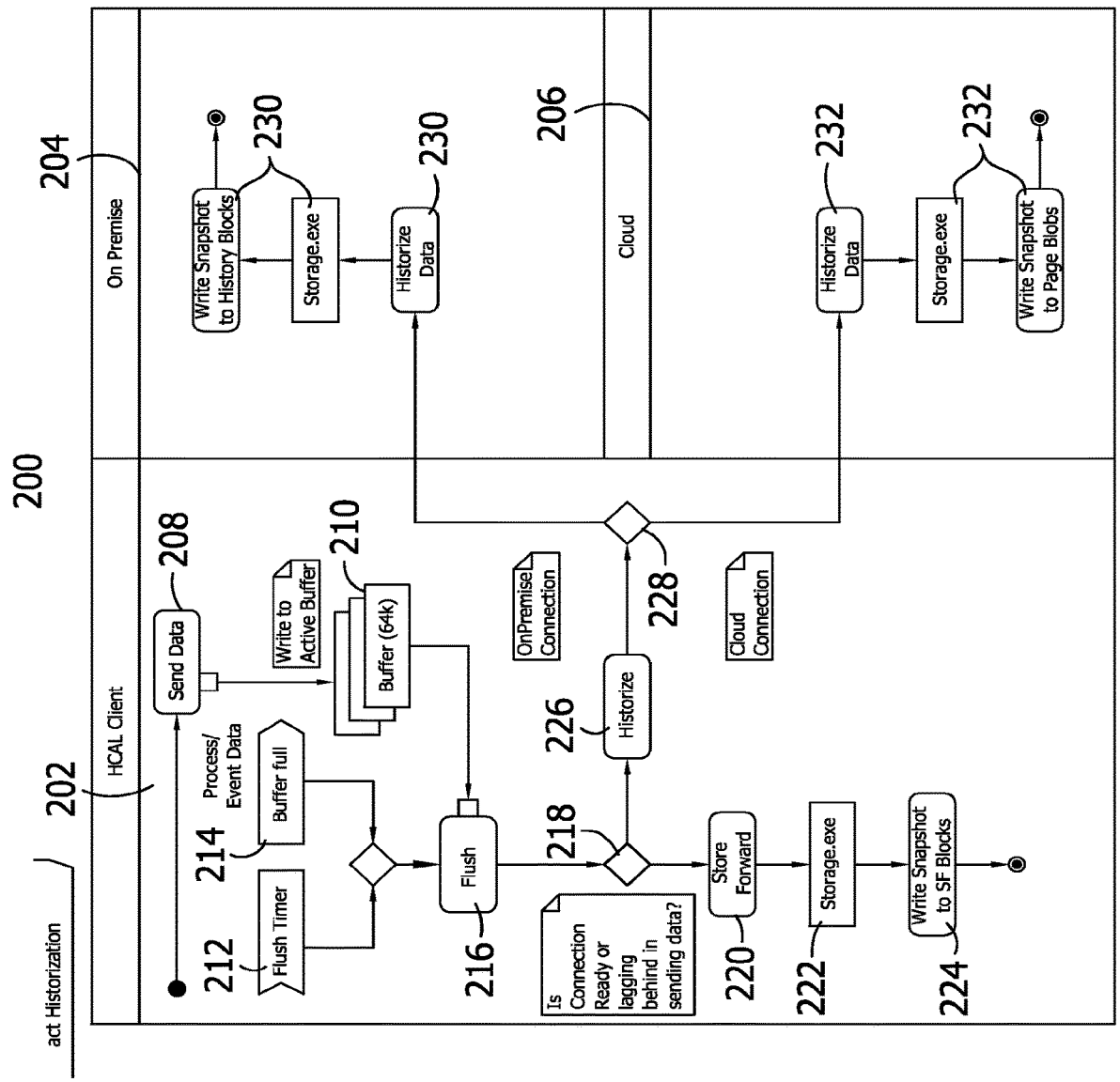
FIG. 2 is an exemplary diagram of a historization workflow performed by the system of FIG. 1.

FIG. 2 describes a workflow 200 for historizing data according to the described system. The Historian Client Access Layer (HCAL) 202 is a client side module used by the client to communicate with historian system 100. The HCAL 202 can be used by one or more different clients for transmitting data to historian system 100. The data to be sent 208 comes into the HCAL 202 and is stored in an active buffer 210. The active buffer 210 has a limited size. When the active buffer is full 214, the active buffer is "flushed" 216, meaning it is cleared of the data and the data is sent to historian 100. There is also a flush timer 212 which will periodically cause the data to be sent from the active buffer 210, even if the active buffer 210 is not yet full.

When historizing 226, the data may be sent to a historian that is on premises 204 or a historian that stores data in the cloud 206 (step 228). The HCAL 202 treats each type of historian in the same way. However, the types of historians may store the data in different ways. In an embodiment, the on-premises historian 204 historizes the data by storing the data as files in history blocks 230. The cloud historian 206 historizes the data by storing the data in page blobs 232, which enable optimized random read and write operations.

In the event that the connection between HCAL 202 and the historian 204 or 206 is not working properly, the flushed data from the active buffer 210 is sent to a store forward module 220 on the client (step 218). The data is stored 222 in the store forward module 220 in the form of snapshots written to store forward blocks 224 until the connection to the historian is functional again and the data can be properly transmitted. The store forward module 220 may also dispose of data after a certain period of time or when it is full. In those cases, it will send an error to the system to indicate that data is not being retained.

Figure 3:
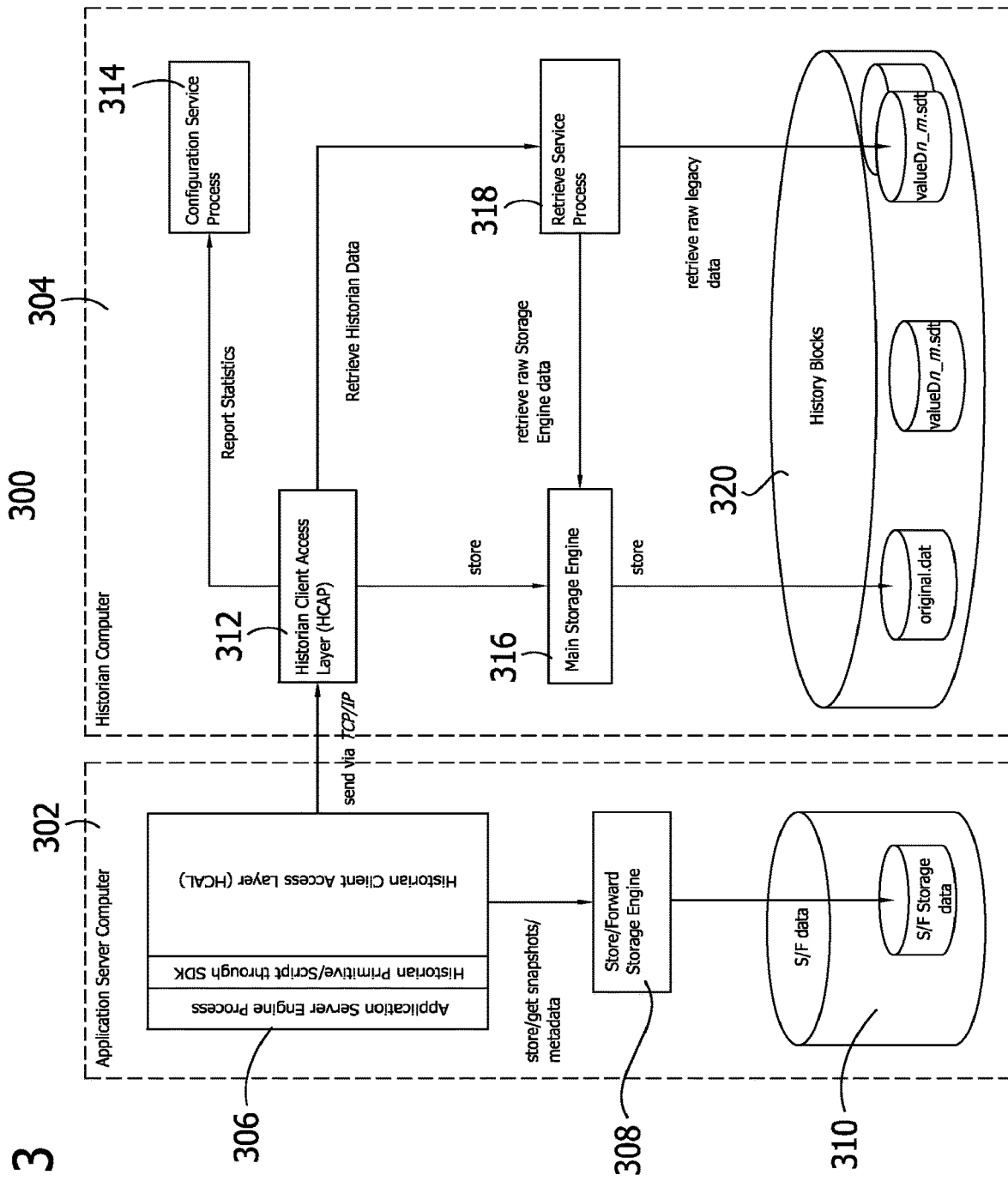
FIG. 3 is an exemplary diagram of the structure of the system of FIG. 1.

FIG. 3 is a diagram displaying the historization system structure in a slightly different way from FIG. 2. An HCAL 306 is hosted on an application server computer 302 and connected to a historian computer 304 and a store forward process 308. The HCAL 306 connects to the historian through a server side module known as the Historian Client Access Point (HCAP) 312. The HCAP 312 has a variety of functions, including sending data received from HCAL 306 to be stored in history blocks 320. The HCAP 312 also serves to report statistics to a configuration service process 314 and retrieve historian data from a retrieval service process 318.

The HCAL 306 connects to the store forward process 308 through a storage engine used to control the store forward process. The Storage Engine enables the HCAL 306 to store and retrieve snapshots and metadata 310 of the data being collected and sent to the historian. In an embodiment, the store forward process 308 on the application server computer 302 is a child Storage Engine process 308 related to a main Storage Engine process 316 running on the historian computer 304.

In addition, HCAL 306 provides functions to connect to the historian computer 304 either synchronously or asynchronously. On successful call of the connection function, a connection handle is returned to client. The connection handle can then be used for other subsequent function calls related to this connection. The HCAL 306 allows its client to connect to multiple historians. In an embodiment, an "OpenConnection" function is called for each historian. Each call returns different connection handle associated with the connection. The HCAL 306 is responsible for establishing and maintaining the connection to the historian computer 304. While connected, HCAL 306 pings the historian computer 304 periodically to keep the connection alive. If the connection is broken, HCAL 306 will also try to restore the connection periodically.

In an embodiment, HCAL 306 connects to the historian computer 304 synchronously. The HCAL 306 returns a valid connection handle for a synchronous connection only when the historian computer 304 is accessible and other requirements such as authentication are met.

In an embodiment, HCAL 306 connects to the historian computer 304 asynchronously. Asynchronous connection requests are configured to return a valid connection handle even when the historian 304 is not accessible. Tags and data can be sent immediately after the connection handle is obtained. When disconnected from the historian computer 304, they will be stored in the HCAL's local cache while HCAL 306 tries to establish the connection.

In an embodiment, multiple clients connect to the same historian computer 304 through one instance of HCAL 306. An application engine has a historian primitive sending data to the historian computer 304 while an object script can use the historian software development kit (SDK) to communicate with the same historian 304. Both are accessing the same HCAL 306 instance in the application engine process. These client connections are linked to the same server object. HCAL Parameters common to the destination historian, such as those for store forward, are shared among these connections. To avoid conflicts, certain rules have to be followed.

In the order of connections made, the first connection is treated as the primary connection and connections formed after the first are secondary connections. Parameters set by the primary connection will be in effect until all connections are closed. User credentials of secondary connections have to match with those of the primary connection or the connection will fail. Store Forward parameters can only be set in the primary connection. Parameters set by secondary connections will be ignored and errors returned. Communication parameters such as compression can only be set by the primary connection. Buffer memory size can only be set by the primary connection.

The HCAL 306 provides an option called store/forward to allow data be sent to local storage when it is unable to send to the historian. The data will be saved to a designated local folder and later forwarded to the historian.

The client 302 enables store/forward right after a connection handle is obtained from the HCAL 306. The store/forward setting is enabled by calling a HCAL 306 function with store/forward parameters such as the local folder name.

The Storage Engine 308 handles store/forward according to an embodiment of the invention. Once store/forward is enabled, a Storage Engine process 316 will be launched for a target historian 304. The HCAL 306 keeps Storage Engine 308 alive by pinging it periodically. When data is added to local cache memory it is also added to Storage Engine 308. A streamed data buffer will be sent to Storage Engine 308 only when the HCAL 306 detects that it cannot send to the historian 304.

If store/forward is not enabled, streamed data values cannot be accepted by the HCAL 306 unless the tag associated with the data value has already been added to the historian 304. All values will be accumulated in the buffer and sent to the historian 304. If connection to the historian 304 is lost, values will be accepted until all buffers are full. Errors will be returned when further values are sent to the HCAL 306.

The HCAL 306 can be used by OLEDB or SDK applications for data retrieval. The client issues a retrieval request by calling the HCAL 306 with specific information about the query, such as the names of tags for which to retrieve data, start and end time, retrieval mode, and resolution. The HCAL 306 passes the request on to the historian 304, which starts the process of retrieving the results. The client repeatedly calls the HCAL 306 to obtain the next row in the results set until informed that no more data is available. Internally, the HCAL 306 receives compressed buffers containing multiple row sets from the historian 304, which it decompresses, unpacks and feeds back to the user one row at a time. Advantageously, network round trips are kept to a minimum. The HCAL 306 supports all modes of retrieval exposed by the historian.

Figure 4:
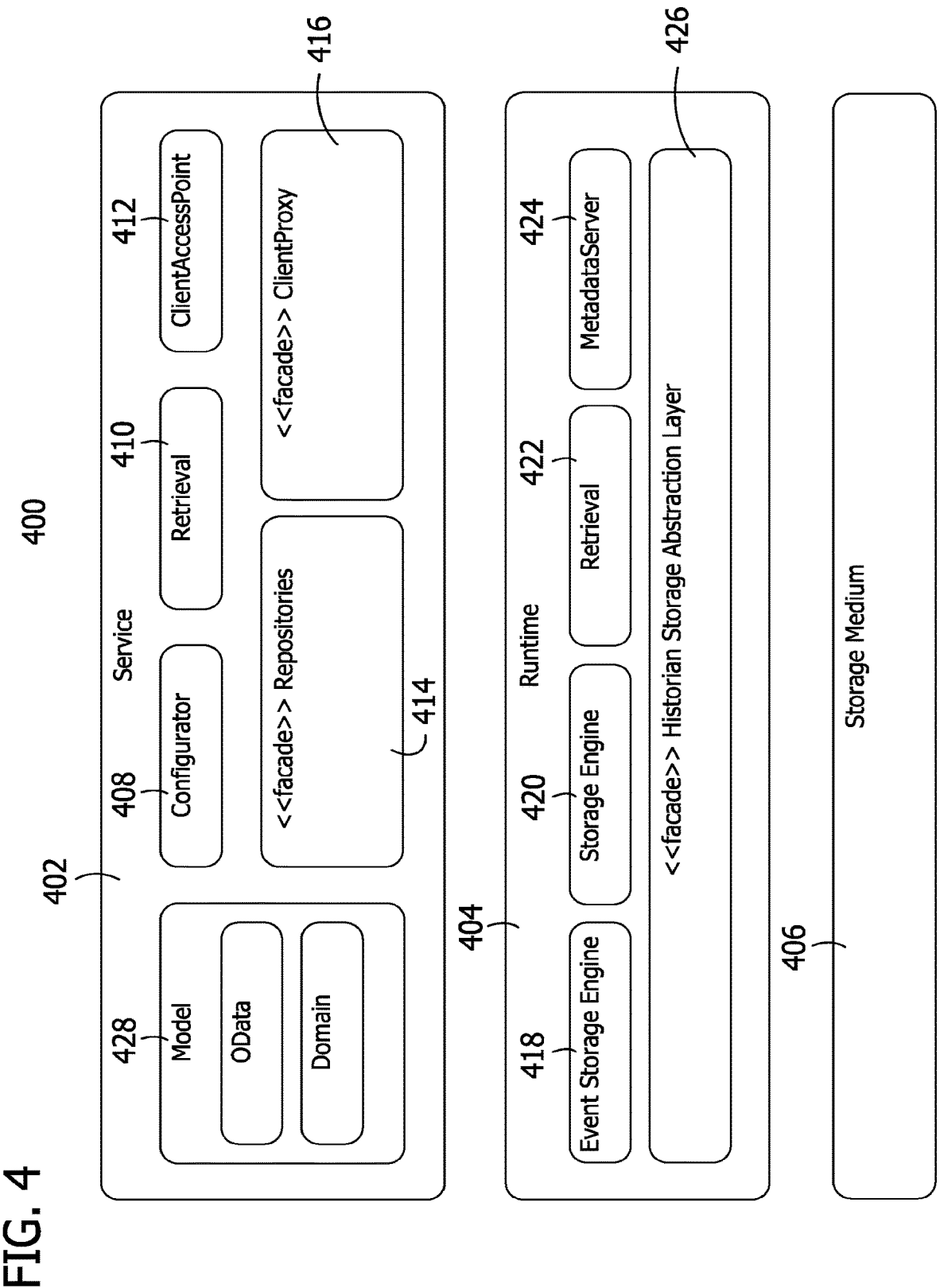
FIG. 4 is an exemplary diagram of cloud historian abstraction layers generally according to an embodiment of the invention.

FIG. 4 shows a diagram 400 of the components in each layer of a historian retrieval system. The hosting components in service layer 402 include a configurator 408, a retrieval component 410, and a client access point 412. There are simple processes that are responsible for injecting the facades into the model and have minimal logic beyond configuration of the libraries and expose communication endpoints to external networks. The hosting components could be the same or different implementation for cloud and on premises. In FIG. 4, there are three integration points for cloud and on premise implementation. A repository 414 is responsible for communicating with data storage such as runtime database or configuration table storage components. A client proxy 416 is responsible for communicating with run-time nodes. An HSAL 426, which is present in runtime layer 404, is responsible for reading and writing to a storage medium 406 as described above. The service layer 402 further includes a model module 428.

In addition to the HSAL 426, the runtime layer 404 includes a component for event storage 418, a storage component 420, a metadata server 422, and a retrieval component 424.

In an embodiment, for tenants and data sources, the repositories 414 serve as interfaces that read and write data using either page blob table storage or an SQL Server database. For tags, process values and events, the repositories 414 act as thin wrappers around the client proxy 416. In operation, the client proxy 416 uses the correct communication channel and messages to send data to the runtime engine 404. The historian storage abstraction layer 426 is an interface that mimics an I/O interface for reading and writing byte arrays. The implementation is configurable to either write to disk or page blob storage as described above.

In an embodiment, the historian system stores metadata in the form of tag objects. Every historian tag object is a metadata instance, which contains tag properties such as tag name, tag type, value range, and storage type. Moreover, the tag object is uniquely defined by a tag ID, which is a 16-byte globally unique identifier (GUID). The stored metadata includes values that determine how the associated data values are stored. This includes metadata that indicates whether the associated data value is a floating point value, an integer value, or the like. The metadata includes, for example, an engineering unit range that indicates a range in which the associated data value must reside for the particular engineering units being used. In an embodiment, the historian system makes use of the engineering unit range to scale the raw data value when storing it on the data server. For instance, data values may be scaled to values between 0.0 and 1.0 based on the engineering unit range included in the metadata. Because the metadata contains the engineering unit range, the scaled value stored by the historian can be converted back to the raw data value with the added engineering units for presentation to user. For example, if the data value is of a data type known to only return values between −10 and 30, a data value of 30 is scaled to 1.0 and a data value of −10 is scaled to 0.0. A data value of 10 is scaled to 0.5. As a result, the scaled data values as stored on the data server cannot be interpreted correctly without knowing the related metadata in order to convert from scaled value to true value with the appropriate units.

The concept of tags is different from the concept of tag metadata instances. A tag is identified by a tag name, while a metadata instance is identified by tag ID. So for the same tag the system can have several metadata instances sharing the same name, but having different tag IDs. For example, the same tag could be reconfigured several times along the way. It could be created first as 16-bit unsigned integer, collect some 16-bit data, then reconfigured to be 32-bit unsigned integer, collect some 32-bit data, then reconfigured to 32-bit float. In this example, it comprises a single tag but has three different tag metadata instances identified by tag ID. A tag metadata instance can also be called a tag version. Tracking tag metadata is essential for data processing and, advantageously, the historian tracks what is stored in the raw binary data chunks. The historian stores tag versions in two places: A tag table (and its dependent tables) of a runtime database stores the most recent tag metadata called the current version, and the history blocks, where, for instance, tag metadata for classic tags is stored in files tags.dat, and for the other tags in files taginfo.dat.

When a tag is reconfigured over time, the runtime database maintains the current version. All previous versions can be found in the history blocks where previous versions are stored.

Figure 5:
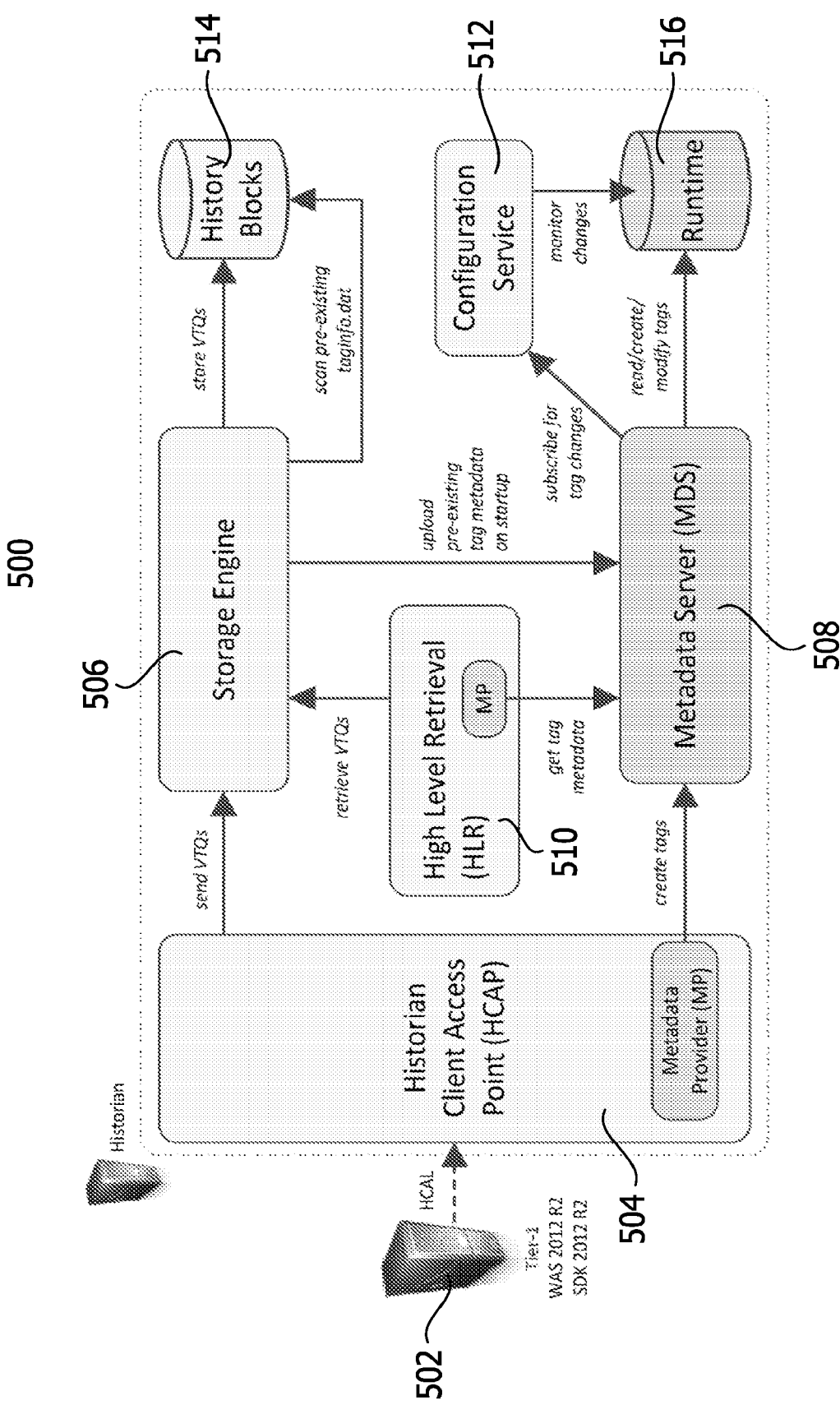
FIG. 5 is an exemplary diagram describing a metadata server in relation to the rest of the historian system of FIG. 1.

A Metadata Server (MDS) according to aspects of the invention is a module responsible for tag metadata storage and retrieval. FIG. 5 shows a diagram 500 describing the relationships of the MDS 508 to other components of the historian. An HCAL 502 is connected to the historian by HCAP 504 as described above. A storage engine 506 receives data from the HCAP 504. A retrieval module 510 accesses data from the storage engine 506 and metadata from the MDS 508 to retrieve it in response to queries. The storage engine 506 stores data in history blocks 514 and uploads pre-existing tag metadata to the MDS 508 on startup. All tag versions are stored in the Runtime database 516 for modern tags. For seamless backward compatibility, the storage engine 506 discovers files in history blocks 514 and uploads all found tag versions into MDS 508. Internally, MDS 508 maintains two containers in memory indexed by tag ID and tag name. The two containers in this embodiment comprise the runtime cache and the history cache. The runtime cache contains all tag metadata present in the tag table of the runtime database and its dependent tables for modern tags. The MDS 508 subscribes to runtime database 516 change notifications via a configuration service 512 so if tags are added or modified in the runtime database 516, MDS 508 immediately updates its runtime cache to mirror the tag table.

Figure 6:
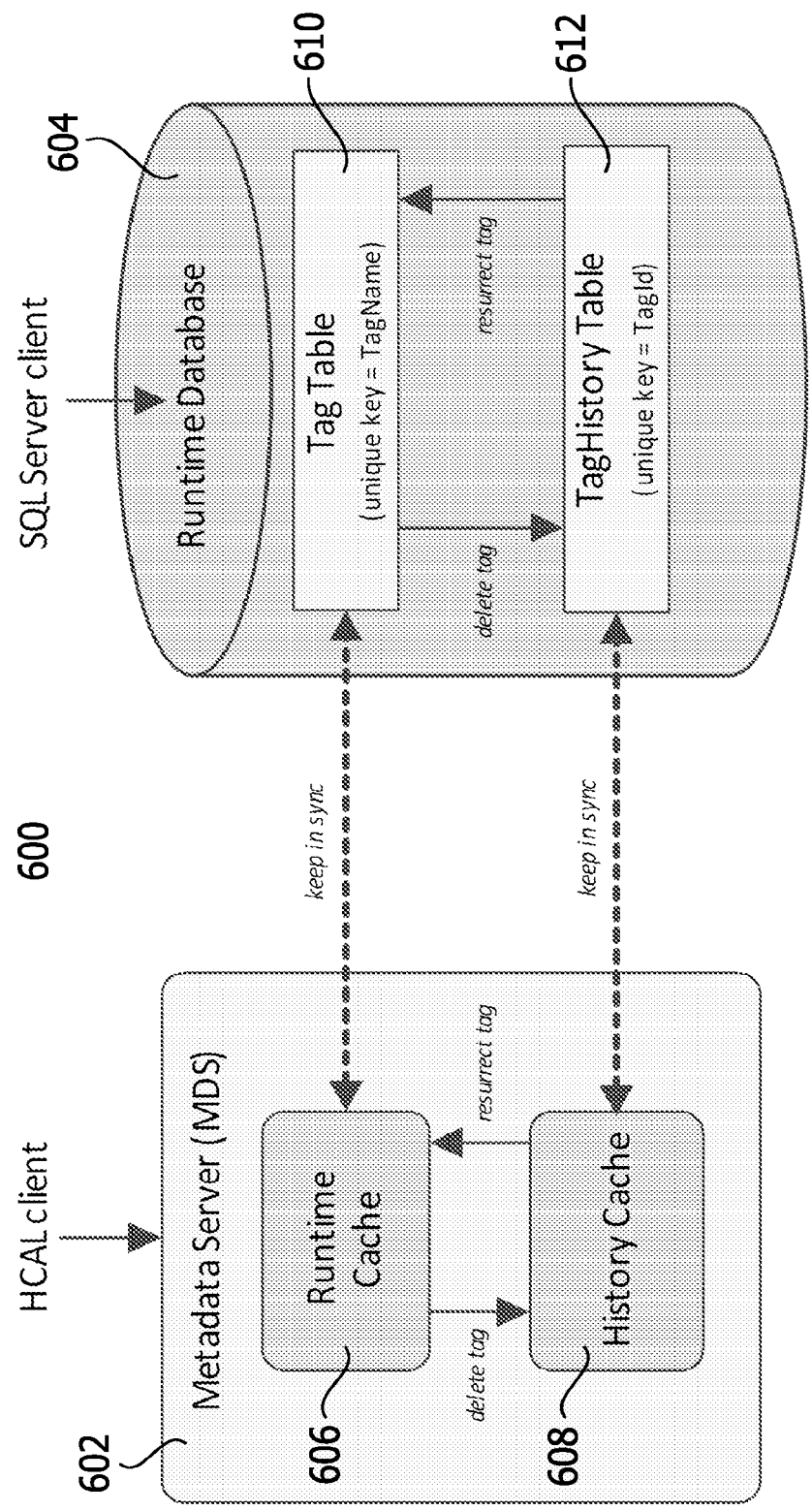
FIG. 6 is an exemplary diagram describing tag metadata caching according to an embodiment of the invention.

A diagram 600 of FIG. 6 illustrates the relationship between an MDS 602 cache and a runtime database 604. A runtime cache 606 interacts with a history cache 608 within the MDS 602 by deleting and resurrecting tags as necessary. A tag table 610, which keys on tag names, and a tag history table 612, which keys on tag IDs, interact with each other within the runtime database 604 by similarly deleting and resurrecting tags as necessary. The MDS 602 synchronizes the caches 606 and 608 with the tables 610 and 612 within the runtime database 604. The runtime cache 606 is kept in sync with the tag table 610. The history cache 608 is kept in sync with the tag history table 612. When tags are deleted or resurrected between the tables 610 and 612 in the runtime database 604, the caches 606 and 608 are synchronized to reflect this change. Synchronization also works the other direction, with changes in the caches 606 and 608 occurring in the tables 610 and 612.

If a tag is requested to be deleted, it is moved from the runtime cache 606 to the history cache 608. A reverse process is called tag resurrection, causing the MDS 602 to search the history cache 608 to find a tag metadata instance with all the same properties and a tag ID which can be reused again. The runtime database 604 implements a similar logic. Instead of generating a brand new tag ID it tries to reuse the existing one from the tag history table 612 and move the corresponding tag record from the tag history table 612 to the tag table 610. Advantageously, the tag resurrection logic prevents generating an unlimited number of tag metadata instances in scenarios when the tag properties are periodically changed.

Figure 7:
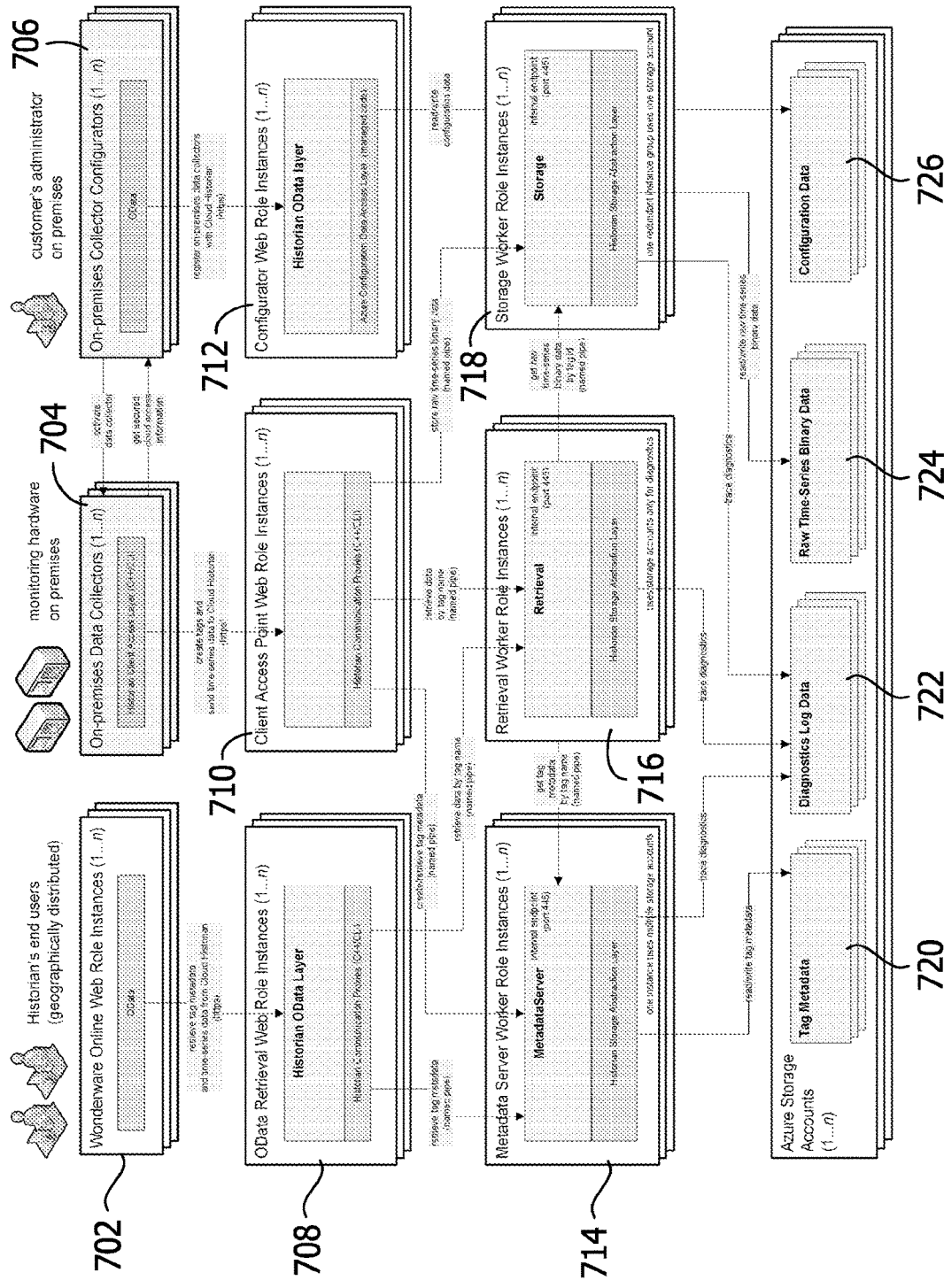
FIG. 7 is an exemplary diagram describing the dependencies between elements of the Historian system.

FIG. 7 illustrates the dependencies and relationships of various modules in the historian system in the form of a diagram 700. In an embodiment, the described modules in diagram 700 comprise processor-executable instructions for fulfilling the purpose of the modules. At the user level, the historian system comprises an Online Web Role instance 702 for end users accessing historian data from different locations, On-premise Data Collectors 704 for monitoring and gathering data from the historian system from on the premises, and On-premise Collector Configurators 706 for configuration administration of the historian system.

The Web Role instance 702 connects to a Data Retrieval Web Role module 708 to retrieve tag metadata and time-series data from the historian. In an embodiment, the Data Retrieval Web Role module 708 comprises an OData layer. The Data Retrieval Web Role module 708 connects to both a Metadata Server Worker Module 714 to retrieve tag metadata 720 and a Retrieval Worker module 716 to retrieve data by tag name.

The On-premise Data Collector 704 connects to a Client Access Point (CAP) module 710 in order to create tags and send time-series data to the historian for storage. The CAP module 710 also connects to the Metadata Server Worker module 714 to create and retrieve tag metadata 720 and the Retrieval Worker module 716 to retrieve data by tag name, and further connects to a Storage Worker module 718 to store raw time-series binary data 724.

The On-premise Collector Configurator 706 connects to a Configurator Web Role module 712 for registering on premise data collectors with the historian and other configuration tasks. The Configurator Web Role module 712 connects to the Storage Worker module 718 for reading and writing configuration data 726 to the database.

The Metadata Server Worker module 714 creates and retrieves tag metadata 720 in a memory storage device of the historian database. The Metadata Server Worker module 714 retrieves metadata and provides it to the Data Retrieval Web Role module 708, the CAP module 710, and the Retrieval Worker module 716. The CAP module 710 also provides new tag metadata to the Metadata Server Worker module 714 to write into the tag metadata 720 in the database. Additionally, the Metadata Server Worker module 714 writes diagnostics log data 722 to the database as necessary.

The Retrieval Worker module 716 of FIG. 7 retrieves tag metadata from the Metadata Server Worker module 714 and raw time-series binary data from the Storage Worker module 718. In an embodiment, the Retrieval Worker module 716 decodes the raw time-series binary data using the tag metadata in order to provide requested data to the Data Retrieval Web Role module 708 and the CAP module 710. Additionally, the Retrieval Worker module 716 stores diagnostics log data 722 on the database as necessary.

The Storage Worker module 718 reads and writes raw time-series binary data 724 in a memory storage device of the database and provides requested raw time-series binary data 724 to the Retrieval Worker module 716. Raw time-series binary data is received from the CAP module 710 and stored in the database. The Storage Worker module 718 receives configuration data 726 from the Configurator Web Role module 712 and writes it to the database, while also retrieving configuration data 726 from the database and providing it to the Configurator Web Role module 712. Additionally, the Storage Worker module 718 stores diagnostics log data 722 on the database as necessary.

In an embodiment, the historian system maintains data for multiple tenants such as different companies and the like. The data from different tenants should be securely isolated so as to prevent access of one tenant's data by another tenant. The historian system provides secure data isolation by making use of the described tag IDs and tenant specific namespaces. Each tenant namespace is made up of uniquely identified tag names within the namespace itself, and that tag names are associated with tag IDs as described above. In an embodiment, the tag IDs are unique identifiers such as universally unique identifiers (UUID) or globally unique identifiers (GUID).

The tag IDs are used to identify tag names and also tag types, raw data formats, storage encoding rules, retrieval rules, and other metadata. A combination of tag metadata properties uniquely identified by a tag ID is called a tag metadata instance, as described above.

Figure 8:
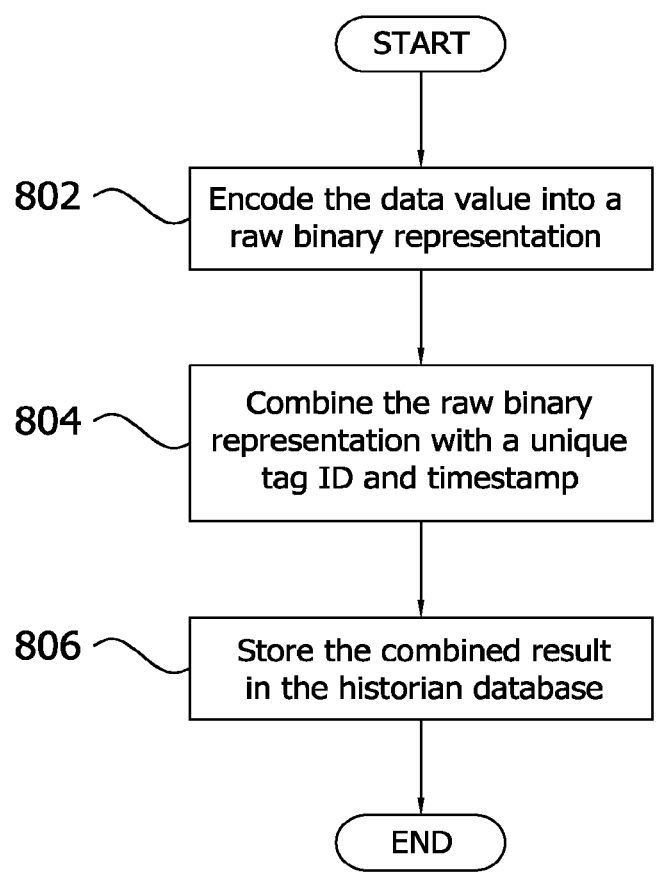
FIG. 8 is an exemplary flowchart describing the process of storing data in the Historian system.

In an embodiment, the historian system uses the divide between raw data and metadata to enforce access security of multiple tenants to the raw data. Storage of the data in the historian system occurs through a series of steps as described by the flowchart in FIG. 8. In an embodiment, the steps are carried out by one or more software modules comprising processor-executable instructions being executed on hardware comprising a processor. At 802, a tenant begins the storage operation by encoding the data value of a tag metadata instance into a raw binary representation of the data value. The raw binary representation is combined with a timestamp and with a unique tag ID corresponding to the tag metadata instance as shown at 804. Proceeding to 806, the combination of data is then stored in an efficient historian database in encoded form on one or more memory storage devices. In an embodiment, a single historian database is used to store encoded data values from multiple tenants and the metadata corresponding to the encoded data values is stored separately. In this way, even if a tenant gains access to raw data that belongs to another tenant, the raw data is encoded and cannot be properly interpreted without knowledge of the metadata instance that corresponds to the tag ID of the encoded data value.

Figure 9:
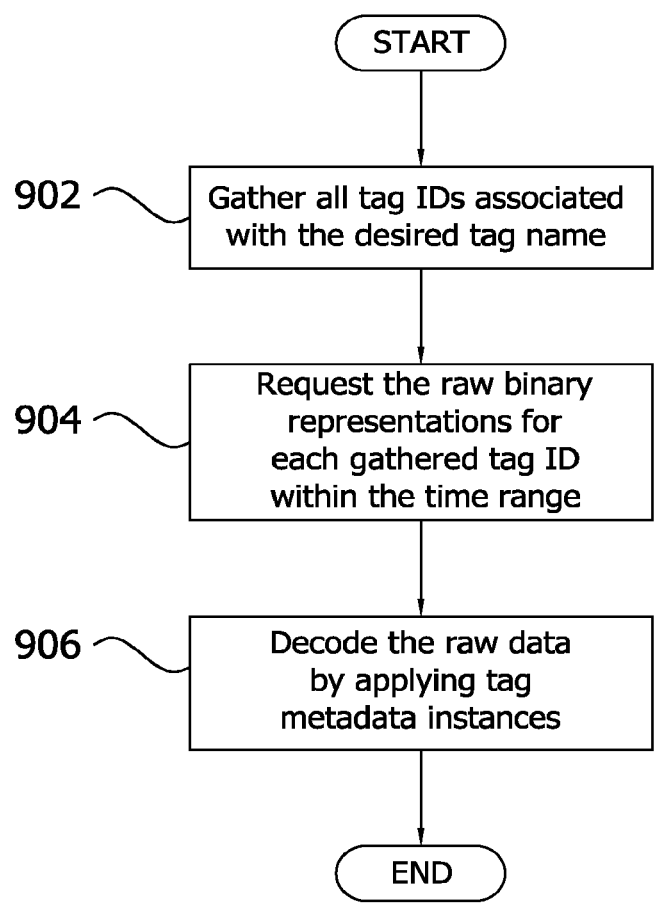
FIG. 9 is an exemplary flowchart describing the process of retrieving data from the Historian system.

Retrieval of data from the historian system is executed as described in the flowchart in FIG. 9. In an embodiment, the steps are carried out by one or more software modules comprising processor-executable instructions being executed on hardware comprising a processor. If a tenant wants to retrieve all the data for a tag name in a time range, first the tenant gathers at 902 all the tag IDs associated to the desired tag name within the tenant's namespace. A tag name may be associated to more than one tag IDs if there are multiple versions of the metadata instance or the like. In an embodiment, the tag IDs are stored by a metadata server on one or more memory storage devices of the historian database. At 904, the tenant requests the raw binary data representations for each of the gathered tag IDs within the desired time range from the one or more memory storage devices of the historian database. Upon receiving the raw binary representations, the tenant decodes the raw data by applying the tag metadata instances corresponding to the tag IDs to the raw binary representations in order to interpret the raw binary representations as shown at 906. The decoding of the raw binary data may occur at the tenant's location or within the historian system if desired.

Tag metadata instances for a particular tenant are stored in a separate database which is, for example, accessible by the particular tenant. This database may be located at the tenant's location or within the historian infrastructure. In this way, the tenant's metadata is secure. Because the metadata is necessary to properly interpret the encoded raw data, the encoded raw data is secure while being stored in a single, efficient historian database along with encoded raw data from other tenants. Encoding of the data can include scaling of the data values according to metadata of the values as described above, or other similar encoding schemes based on the associated metadata. Because the raw data of multiple tenants is stored together, a malicious party who gains access to the raw data database will not necessarily know which tag IDs belong to which tenant. This makes it very difficult for the malicious party to determine what kind of data they are accessing and which tenant's metadata will decode the data.

In an embodiment, the data security is further enforced by a protected account scheme. The protected account scheme comprises separate storage account keys for each tenant. Each tenant has at least one storage account key for accessing metadata instances in the tenant's metadata storage account and at least one storage account key for accessing the data values in the tenant's data storage account. The accounts cannot be accessed without the associated storage account key. In this way, obtaining a single storage account key for the metadata instances for a tenant yields no real information without the storage account key corresponding to the associated data values. Likewise, obtaining a storage account key for data values of a tenant yields no real information without the storage account key corresponding to the associated metadata instances. Storage account key data for tenants is also maintained in a protected form requiring the use of a tenant certificate for access.

According to further aspects of the invention, tag metadata instances are extended with additional properties. An end user or other software application can add extended tag properties for a variety of purposes. The extended properties can be used to store additional detail about a tag, make it easier to search for a certain tag, or to group tags logically based on the extended tag property. For example, an extended tag property identifies the manufacturer of an associated piece of equipment or a geographic location. Extended tag properties can be used in data queries to retrieve associated tags and data values. In an embodiment, the historian system provides interfaces enabling users to create their own extended tag metadata properties. Extended tag metadata properties created by users of a tenant are configured to have unique property names within that tenant's historian data. For example, the historian system includes pre-defined extended properties in addition to the extended properties that a user may define.

Figure 10:
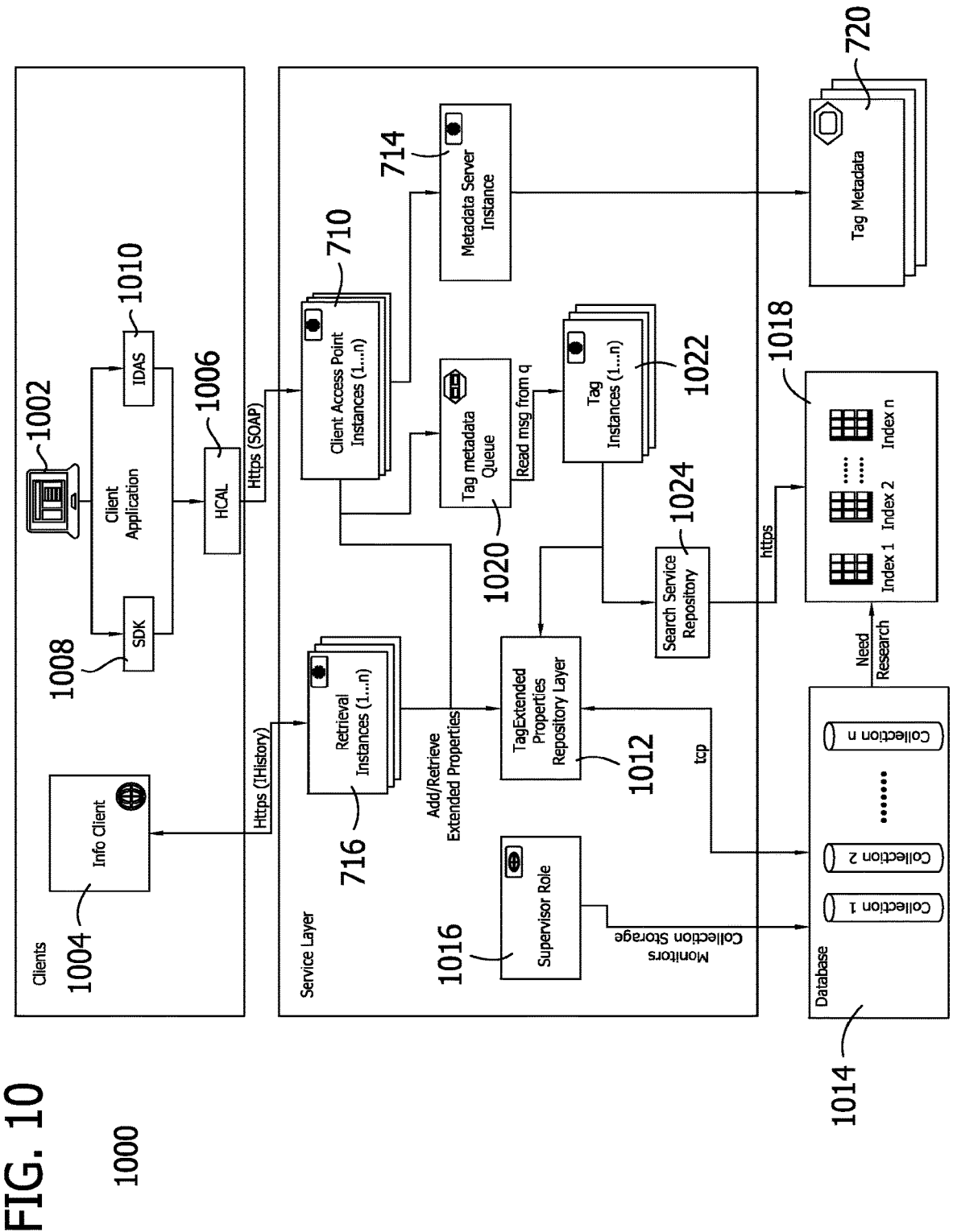
FIG. 10 is an exemplary diagram of the structure of a historian system comprising elements for implementing extended metadata properties.

FIG. 10 illustrates an embodiment of a historian system 1000 with extended tag metadata properties as a block diagram. The client application 1002 connects to the historian system through the HCAL 1006. The HCAL 1006 communicates with the client access point web role module 710 to create and access tag metadata, including extended properties. The client access point web role module 710 connects with the metadata server worker module 714 to store and retrieve tag metadata 720 as described above. The client access point web role module 710 handles connections with multiple client applications. If the historian server is disconnected from HCAL 1006, then the tag extended properties are stored locally and sent to the historian server once the connection is reestablished.

HCAL 1006 exposes methods to store and retrieve the extended properties for a software development kit (SDK) 1008 and an I/O Data Acquisition System (IDAS) 1010. In an embodiment, users create their own client applications to use the exposed methods to store and retrieve their own extended properties. The interface uses, for example, simple object access protocol (SOAP).

In an embodiment, the historian system comprises multiple types of clients that access the extended tag metadata properties. For example, an info client 1004 is a web client that can create an extended tag metadata property and then search existing tags using the extended tag metadata properties as search terms. The info client uses representational state transfer (REST) API's in one embodiment to create extended tag metadata properties and retrieve tags. The info client 1004 connects to the historian service layer through the Retrieval Worker Role module 716.

An extended property repository layer module 1012 enables the client access point web role module 710 and the retrieval worker role module 716 to add and retrieve extended properties from the extended property database 1014. In an embodiment, the extended property database 1014 is separate from the database storing the tag metadata 720. Because the extended property data is dynamic and may easily be expanded by users, it is advantageous to maintain a separate database 1014 to store the extended property data.

In an embodiment, the extended property database 1014 contains separate collections of data, such as in a DocumentDB database. The extended property database 1014 is monitored by the supervisor role module 1016 to ensure that each database collection does not exceed capacity. The supervisor role module 1016 enforces a rule that states when a defined percentage of storage in a collection is consumed, one or more sets of tenant extended property data is migrated from the existing collection to a new collection. During this migration process, any update for that tenant metadata is unavailable for a period of time. Consider an example where a database collection contains the extended property data for three tenants. If this collection reaches the threshold, the supervisor role module migrates all the tags for one of the tenants to a new collection in this embodiment. The supervisor role module 1016 monitors each collection continuously and performs the migration operation automatically based on the rule defined for migrating data. The extended tag metadata properties are stored in a database 1014 of the historian system. The extended tag metadata properties are indexed to enable searching and the index data is stored in a repository index 1018. When a new extended property is added, the index 1018 is updated to include the new extended property.

When an extended property is added to tag metadata, a tag extended property object is queued in a tag metadata queue 1020 to be assigned to a tag worker module 1022. The tag worker module 1022 sends the tag extended property object to the search service 1024 to be indexed. The search service 1024 processes the object and sends the result to the index repository 1018. The search service 1024 updates the search index 1018 with new extended properties and marks the properties as searchable and retrievable. In an embodiment, the search service 1024 only indexes string type extended properties.

In an embodiment, if multiple clients create or update the same extended property in a similar timeframe, the last update is maintained in the database.

In another embodiment, when searching the tag metadata, the query is made against all the searchable fields in the index, which includes the tag metadata as well as the searchable extended properties. Search results include the requested property names and the values of the properties.

Figure 11:
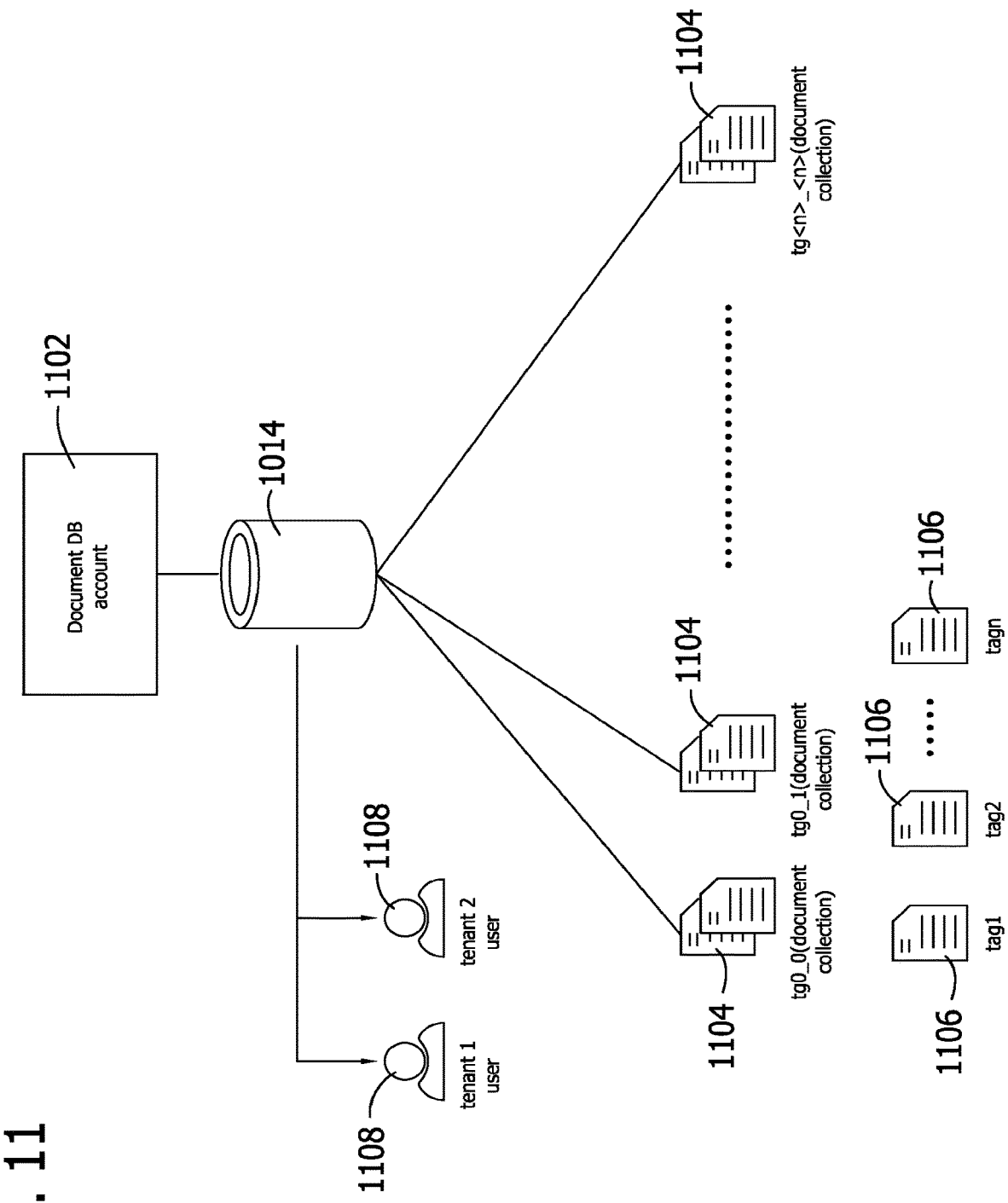
FIG. 11 is an exemplary diagram an extended metadata property database.

FIG. 11 is a diagram illustrating the relationships of collections within the extended property database 1014. A database 1014 for the historian system is created under a master database account 1102. The master database account 1102 is secured by a master key, which is encrypted and only used by web and worker role modules 710 and 716. This database 1014 holds one or more document collections 1104 and the collections 1104 hold the documents 1106 containing the tag metadata. Document collections 1104 are associated at the tenant group level. A minimum of one collection exists for a tenant group and more collections can be added as described above.

In an embodiment, a tenant user account 1108 for each tenant is created and given read-only access to resources that they own. During retrieval, a tenant's user access token is provided to the system. In response, the system only retrieves documents that are owned by the tenant. The permissions for access are set at document collection level. In an alternative embodiment, the permissions are set at the single document level.

In some cases, tag metadata along with extended properties for multiple tenants is stored in the same collection to reduce the overall resources necessary for the application and minimize costs to tenants for operating the database. Tenant metadata is identified by the tenant ID property in the stored documents and queries are filtered to retrieve tenant-specific data.

In an embodiment, extended properties and related tag metadata are stored in the extended property database in a document format such as the example below. One tag document per tag is created. The document ID is a hash of a Fully Qualified Name (FQN), which is a unique name for the tag, and the tenant id.

Tag Document:

```
{
"id": "hashoffqnandtenantid",
"fqn":"DS1.ReactTemp",
"tenantid":"t23456789",
"tagname":"ReactTemp",
"source":"DS1",
"description":"",
"engunit":"None",
"engunitmax":100,
"engunitmin":0,
"interpolationtype":"stairstep",
"messageoff":"",
"messageon": "",
"tagtype": "Analog",
"property1": "value1",
"property2": 277
}
```

A tag-specific document in the first collection of the tenant group is configured for storing all the properties and attributes of a tag. In an embodiment, when creating a tenant, a set of pre-defined or recommended extended properties are created. For example, all of the existing system tag properties are created with "read-only" set to true. An extended properties document is created for each tenant storing a list of extended properties, including the name of the property and the type of the property. Extended properties can be a variety of data types, including strings, integers, doubles, date time values, ID values such as GUIDs, Boolean values, geographic properties, geometric properties, and the like. Property names are unique for a tenant. In an embodiment, the extended properties document also stores whether each extended property is read-only. Below is an exemplary extended properties document.

ExtendedProperties Document:

```
{
    "id": "tenantid_properties",
    "tenantid": " t23456789"
    "properties"[
        {
            "name": property1,
            "type": "string",
            "readonly": false
        },
        {
            "name": property2,
            "type": "int",
            "readonly": false
        },
    ]
}
```

In an embodiment, all the metadata properties along with the extended properties are stored in this manner in order to use one database for all property retrieval. Alternatively, a query option may be included to select to query the metadata server for tag metadata. If deletion of an extended property is requested, the extended property is set to NULL in the database so that it can no longer be searched, rather than requiring the database to be re-indexed after removal of the extended property.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A historian system comprising:
   a processor configured and arranged to be coupled to a network connection;
   a non-transitory memory device coupled to the processor, comprising processor executable instructions for, when executed, receiving and responding to messages; and
   a tag metadata database module comprising processor executable instructions stored on a non-transitory computer readable medium that when executed implements:
      storing, in a tag metadata database, tag metadata of data received via the network connection, wherein the tag metadata has a predefined set of properties; and
      retrieving the tag metadata in response to one or more requests received via the network connection or from within the historian system;
      creating user-defined extended properties for the tag metadata in response to requests received via the network connection, wherein the extended properties each include a tenant ID, and wherein the tenant ID is used to filter the extended properties to retrieve one or more of the extended properties associated with a tenant that requested extended property data;
      storing the extended properties in an extended properties database;
      retrieving the extended properties from the extended properties database in response to requests received via the network connection or from within the historian system;
      indexing extended properties, the indexes enabling the extended properties to be found in the extended properties database;
      searching the indexed extended properties in response to requests; and
      providing indexes of extended properties stored by the extended property database module.

2. The historian system of claim 1, wherein the system is connected to a plurality of client devices via the network connection.

3. The historian system of claim 2, wherein a first client device of the plurality of client devices is associated with a first tenant and a second client device of the plurality of client devices is associated with a second tenant.

4. The historian system of claim 1, wherein storing the extended properties further comprises:
   storing the extended properties as extended property documents in a first collection of extended property documents;
   monitoring a remaining capacity of the first collection of extended property documents; and
   migrating a plurality of extended property documents from the first collection to a second collection of extended property documents upon detecting that storing the extended property documents in the first collection would cause the first collection to exceed its remaining capacity.

5. The historian system of claim 4, wherein the first collection of extended property documents comprises extended property documents from more than one tenant.

6. The historian system of claim 1, further comprising instructions for, when executed, assigning a property of one of searchable and not searchable to the extended properties; and
   further comprising instructions for, when executed, indexing extended properties only if the extended properties have been assigned a searchable property.

7. A method for creating extended metadata properties in a historian system comprising:
   receiving a first request to create a user-defined extended property for a tag metadata instance, wherein the tag metadata instance has a pre-defined set of properties, and wherein the extended property includes a tenant ID;
   locating a record of the tag metadata instance;
   updating the record of the tag metadata instance to include the extended property;
   creating a document of the extended property in an extended property database of the historian system; and
   indexing the extended property document in the search index of the historian system, wherein the tenant ID is used to filter extended properties to retrieve a requested record associated with a tenant.

8. The method of claim 7, wherein the first request to create an extended property is received by the historian system from a first client device coupled to the historian system by a network.

9. The method of claim 8, wherein a second request to create an extended property is received by the historian system from a second client device, and wherein the first and second client devices are associated with separate tenants.

10. The method of claim 7, wherein the first request to create an extended property is received through a representational state transfer (REST) interface.

11. The method of claim 8, wherein the first request to create an extended property is received through a simple object access protocol (SOAP).

12. The method of claim 7, wherein the tag metadata instance record is stored separately from the extended property document.

13. The method of claim 7 further comprising:
   storing the created extended property document in a first collection of extended property documents;
   monitoring a remaining capacity of the first collection of extended property documents; and
   migrating a plurality of extended property documents from the first collection to a second collection of extended property documents upon detecting that storing the created extended property document in the first collection would cause the first collection to exceed its remaining capacity.

\* \* \* \* \*